United States Patent
Cheng et al.

(10) Patent No.: US 9,952,465 B2
(45) Date of Patent: Apr. 24, 2018

(54) LIQUID CRYSTAL PANEL AND LIQUID CRYSTAL DISPLAY DEVICE

(71) Applicant: BOE TECHNOLOGY GROUP CO., LTD., Beijing (CN)

(72) Inventors: Hongfei Cheng, Beijing (CN); Jianbo Xian, Beijing (CN); Yong Qiao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 36 days.

(21) Appl. No.: 14/894,589

(22) PCT Filed: May 19, 2015

(86) PCT No.: PCT/CN2015/079289
§ 371 (c)(1),
(2) Date: Nov. 30, 2015

(87) PCT Pub. No.: WO2016/086618
PCT Pub. Date: Jun. 9, 2016

(65) Prior Publication Data
US 2017/0010507 A1  Jan. 12, 2017

(30) Foreign Application Priority Data
Dec. 3, 2014 (CN) .................... 2014 2 0750527 U

(51) Int. Cl.
*G02F 1/1337* (2006.01)
*G02F 1/1343* (2006.01)
(Continued)

(52) U.S. Cl.
CPC ...... *G02F 1/133707* (2013.01); *G02F 1/1337* (2013.01); *G02F 1/133514* (2013.01);
(Continued)

(58) Field of Classification Search
CPC ... G02F 2001/136222; G02F 1/133514; G02F 1/133707; G02F 2001/133357; G02F 2001/133742
See application file for complete search history.

(56) References Cited

U.S. PATENT DOCUMENTS 6,424,397 B1   7/2002  Kuo
7,199,856 B2   4/2007  Inoue et al.
(Continued)

FOREIGN PATENT DOCUMENTS

CN   101364011 A   2/2009
CN   102236216 A   11/2011
(Continued)

OTHER PUBLICATIONS

International Search Report of PCT/CN2015/079289 in Chinese, dated Aug. 6, 2015 with English translation.
(Continued)

*Primary Examiner* — Dennis Y Kim
(74) *Attorney, Agent, or Firm* — Collard & Roe, P.C.

(57) ABSTRACT

A liquid crystal panel and a liquid crystal display device are provided. The liquid crystal panel includes a color filter substrate and an array substrate disposed opposite to each other, and a liquid crystal layer (170) located between the color filter substrate and the array substrate, and liquid crystals in the liquid crystal layer are vertically aligned. A protrusive structure (150, 55) is provided on the color filter substrate and/or the array substrate, and a recess (160, 65) is provided around the protrusive structure (150, 55).

9 Claims, 7 Drawing Sheets

(51) Int. Cl.
*G02F 1/1335* (2006.01)
*G02F 1/1362* (2006.01)
*G02F 1/1333* (2006.01)

(52) U.S. Cl.
CPC .. *G02F 1/134309* (2013.01); *G02F 1/136286* (2013.01); *G02F 2001/133357* (2013.01); *G02F 2001/133742* (2013.01); *G02F 2001/134318* (2013.01); *G02F 2201/121* (2013.01); *G02F 2201/123* (2013.01)

(56) References Cited

U.S. PATENT DOCUMENTS

| | | | |
|---|---|---|---|
| 7,880,845 B2* | 2/2011 | Lee | G02F 1/133707 349/129 |
| 8,405,234 B2* | 3/2013 | Wu | H01L 21/31 257/797 |
| 8,999,465 B2* | 4/2015 | Nakanishi | G02F 1/1337 252/299.5 |
| 9,176,344 B2 | 11/2015 | Jeong et al. | |
| 2004/0075798 A1* | 4/2004 | Inoue | G02F 1/133707 349/129 |
| 2006/0072064 A1* | 4/2006 | Kim | G02F 1/133707 349/187 |
| 2006/0197894 A1* | 9/2006 | Higa | G02F 1/133555 349/114 |
| 2009/0066867 A1* | 3/2009 | Tsubata | G02F 1/136259 349/38 |
| 2009/0073335 A1* | 3/2009 | Yagi | G02F 1/133707 349/39 |
| 2013/0135547 A1* | 5/2013 | Hibayashi | G02B 5/201 349/33 |
| 2013/0141684 A1* | 6/2013 | Xu | G02F 1/133707 349/139 |
| 2013/0242239 A1* | 9/2013 | Chang | G02F 1/133707 349/106 |

FOREIGN PATENT DOCUMENTS

| | | |
|---|---|---|
| CN | 204331229 U | 5/2015 |
| JP | 2008-3372 A | 1/2008 |
| TW | 594135 B | 6/2004 |
| TW | I234040 B | 6/2005 |

OTHER PUBLICATIONS

Notice of Transmittal of the International Search Report of PCT/CN2015/079289 in Chinese, dated Aug. 6, 2015.
Written Opinion of the International Searching Authority of PCT/CN2015/079289 in Chinese, dated Aug. 6, 2015 with English translation.

* cited by examiner

LIQUID CRYSTAL PANEL AND LIQUID CRYSTAL DISPLAY DEVICE

CROSS REFERENCE TO RELATED APPLICATIONS

This application is the National Stage of PCT/CN2015/079289 filed on May 19, 2015, which claims priority under 35 U.S.C. § 119 of Chinese Application No. 201420750527.1 filed on Dec. 3, 2014, the disclosure of which is incorporated by reference.

TECHNICAL FIELD

Embodiments of the present invention relate to a liquid crystal panel and a liquid crystal display device.

BACKGROUND

Wide-viewing angle technologies for liquid crystal display are classified into two categories: one is a horizontal electrical field technology, namely, the electrical field applied to liquid crystals in a liquid crystal panel is substantially parallel to a glass substrate; and the other one is a vertical electric field technology, namely, the electrical field applied to liquid crystals in a liquid crystal panel is perpendicular to a glass substrate.

The wide-viewing angle technologies for liquid crystal display of the two kinds as stated above are each widely applied to products for liquid crystal display. The number of liquid crystal televisions with the vertical electric field technology is in the range of 70 to 80 percent of the total number of liquid crystal televisions. A liquid crystal panel is used for the display panel of a liquid crystal television. In a liquid crystal panel with the vertical electric field technology, vertical alignment is generally used for the liquid crystal alignment, and a protrusive structure is usually used to control the alignment direction of liquid crystal molecules.

However, liquid crystal panels make certain demands on the size, height and number of the protrusive structure, and when the size and height of the protrusive structure are maintained to be constant, the controlling effect of the protrusive structure on alignment of liquid crystal molecules needs to be enhanced.

SUMMARY

According to an embodiment of the present invention, there is provided a liquid crystal panel, which includes a color filter substrate and an array substrate disposed opposite to each other, and a liquid crystal layer located between the color filter substrate and the array substrate, liquid crystals in the liquid crystal layer being aligned vertically, wherein, a protrusive structure is provided on the color filter substrate and/or the array substrate, and a recess is provided around the protrusive structure.

According to some other embodiments of the invention, there is provided a liquid crystal display device, which includes the above liquid crystal panel.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

Figure 1:
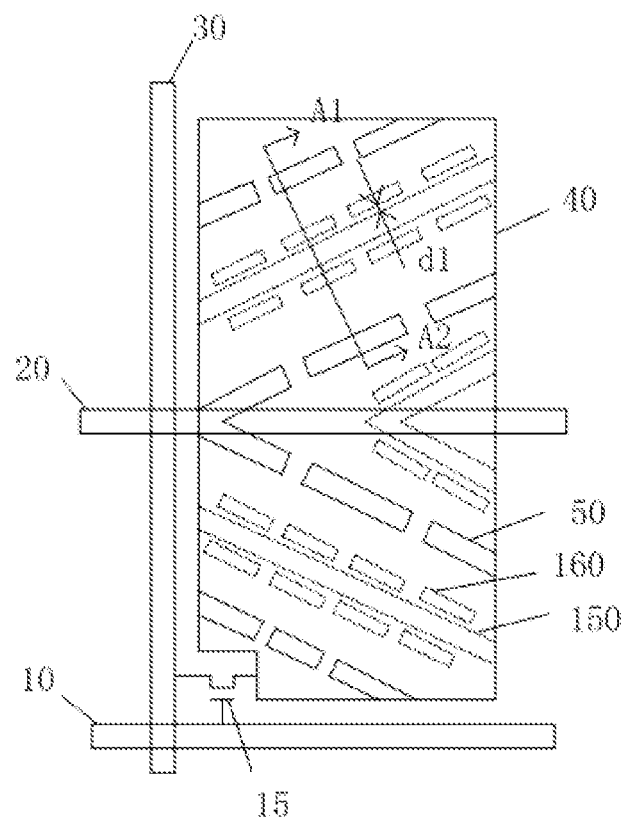
FIG. 1 is a top view illustrating a liquid crystal panel provided by an embodiment of the invention.

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

In descriptions of the present invention, it needs to be understood that, azimuthal or positional relationships indicated by terms "top" and "down" are azimuthal or positional relationships on the basis of those illustrated in drawings, and they are only for the sake of descriptive convenience of the present invention and simplifying the description, but do not indicate or imply that the denoted device or element must have a specific orientation, and be constructed and operated in a specific orientation. Thus, they cannot be understood as limiting of the present invention.

In embodiments of drawings of the invention, the same reference numerals represent the same components or the same functional layers in a liquid crystal panel; but sometimes for the sake of clarity, it is possible that in different embodiments, different reference numerals are used to represent the same components or the same functional layers.

According to an embodiment of the invention, there is provided a liquid crystal panel. Referring to FIG. 1 to FIG. 15, the liquid crystal panel is useful for vertically aligned liquid crystal display, and it includes a color filter substrate and an array substrate disposed opposite to each other. A liquid crystal layer is provided between the color filter substrate and the array substrate, and for example, it adopts vertical alignment (hometropic alignment). That is, the initial state (namely, the case where no voltage is applied to electrodes for driving liquid crystals) of liquid crystal molecules in the liquid crystal layer is vertical alignment. A protrusive structure (150, 55) is provided on the color filter substrate and/or the array substrate, and a recess (160, 65) is provided around the protrusive structure (150, 55). For example, the protrusive structure and the recess are disposed on an interior surface (i.e., a surface facing the liquid crystal layer) of the color filter substrate and/or the array substrate.

In the liquid crystal panel provided by embodiments of the invention, as the recess (160, 65) is provided around the protrusive structure (150, 55), and has a certain depth, the controlling effect of the protrusive structure (150, 55) on the alignment of liquid crystal molecules (170) can be strengthened. The strengthening of controlling effect on the alignment of liquid crystal molecules can be achieved by increasing the depth of the recess (160, 65), and therefore, upon manufacture of the protrusive structure (150, 55), height of the protrusive structure (150, 55) can be appropriately reduced. Thus, the technological difficulty is greatly reduced.

It should be aware that, in the array substrate or the color filter substrate as stated in embodiments of the invention, a glass substrate is at the bottom, and directing upward from the glass substrate, a variety of functional layers are provided in sequence.

Figure 2:
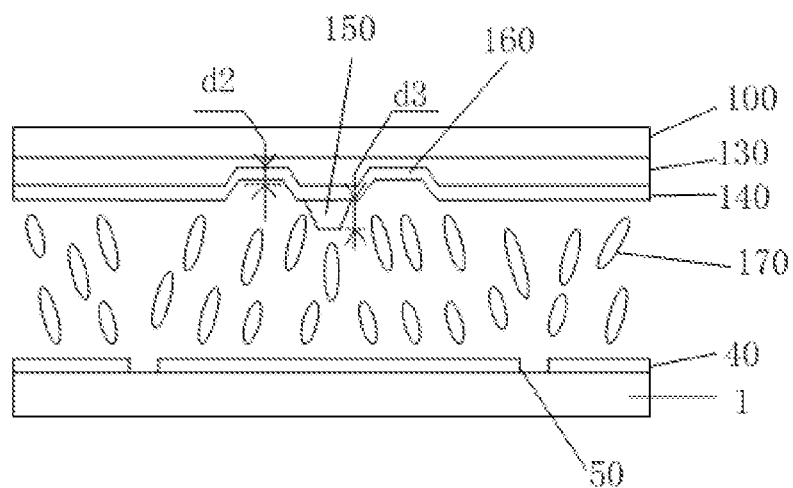
FIG. 2 is a sectional view taken along line A1-A2 of the liquid crystal panel illustrated in FIG. 1.

Referring to a liquid crystal panel illustrated in FIG. 1 and FIG. 2, the liquid crystal panel includes an array substrate and a color filter substrate disposed opposite to each other, and the array substrate may include a base substrate (e.g. which is a glass substrate) 1, a gate line 10, a data line 30, a common electrode line 20 and a pixel electrode 40. For example, slits 50 are provided in the pixel electrode 40, and the pixel electrode 40 is connected to the data line 30 through a thin film transistor 15. The color filter substrate at least includes a glass substrate 100, a color filter layer 130, a common electrode layer 140 and a protrusive structure 150. A recess 160 is provided around the protrusive structure 150; and a liquid crystal layer 170 is provided between the color filter substrate and the array substrate. The color filter substrate may further include a black matrix layer and a planarizing layer, the black matrix layer may be located between the glass substrate 100 and the color filter layer 130, and the planarizing layer may be located between the color filter layer 130 and the common electrode layer 140.

In embodiments of the invention, the color filter substrate includes a glass substrate, preset layers (namely, film layers formed on the substrate) are located on the glass substrate, and a protrusive structure 150 and/or a recess 160 may be located at the preset layers on the color filer substrate. The layer in which the protrusive structure 150 is located lies above the layer in which the recess 160 is located; or, the layer in which the protrusive structure 150 is located is the same as the one in which the recess 160 is located; or, the layer in which the protrusive structure 150 is located lies below the layer in which the recess 160 is located.

The protrusive structure 150 and/or the recess 160 may be located at preset layers of the color filter substrate. For example, the layer in which the protrusive structure 150 is located can be located above the layer in which the recess 160 is located, and can also be situated at the layer where the recess 160 is located, namely, the layer in which the protrusive structure 150 is located and the layer in which the recess 160 is located are the same layer. It is also possible that the layer in which the protrusive structure 150 is located is situated below the layer in which the recess 160 is located. The alignment effect of the protrusive structure 150 on liquid crystal molecules can be strengthened by each of various setting ways of layers in which the protrusive structure 150 and the recess 160 are located.

The protrusive structure 150 and/or the recess 160 may be fabricated with a black matrix layer, a color filter layer or a planarizing layer in the color filter substrate, and the protrusive structure 150 and/or the recess 160 may also be fabricated by means of coating or depositing an alignment structural layer, which may be of an organic resin material or an inorganic material. The layer in which the protrusive structure 150 is located may be a black matrix layer, a color filter layer, a planarizing layer or an alignment structural layer; and the layer in which the recess 160 is located may be a black matrix layer, a color filter layer, a planarizing layer or an alignment structural layer. The layer in which a protrusive layer 150 formed with an alignment structural layer is located may also be called as a protrusive structural layer; the layer in which a recess formed with an alignment structural layer is located may also be called as a recess layer; and the layer in which a protrusive structure and a recess formed with the same alignment structural layer are located may also be called as a protrusive structure and recess layer.

As an embodiment of the invention, other preset layers are each located on a glass substrate. The layer in which the protrusive structure 150 illustrated in FIG. 2 is located is a protrusive structural layer, and situated on the common electrode 140, and the layer in which the recess 160 is located is the color filter layer 130; the layer in which the protrusive structure 150 is located lies above the layer in which the recess 160 is located.

Figure 3:
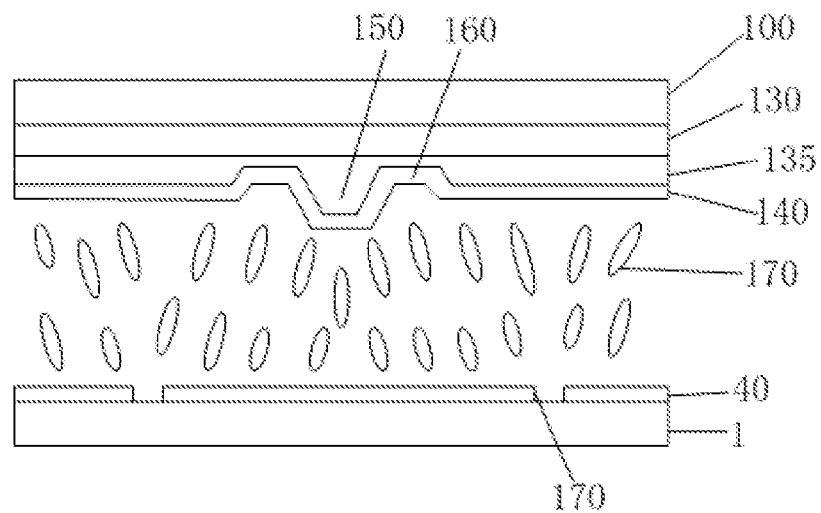
FIG. 3 is a sectional view illustrating a liquid crystal panel provided by an embodiment of the invention.

As an embodiment of the invention, the layer in which a protrusive structure 150 illustrated in FIG. 3 is located is a planarizing layer 135, the layer in which a recess 160 is located is the planarizing layer 135, and the layer where the protrusive structure 150 is located and the layer where the recess 160 is located are the same layer.

Figure 4:
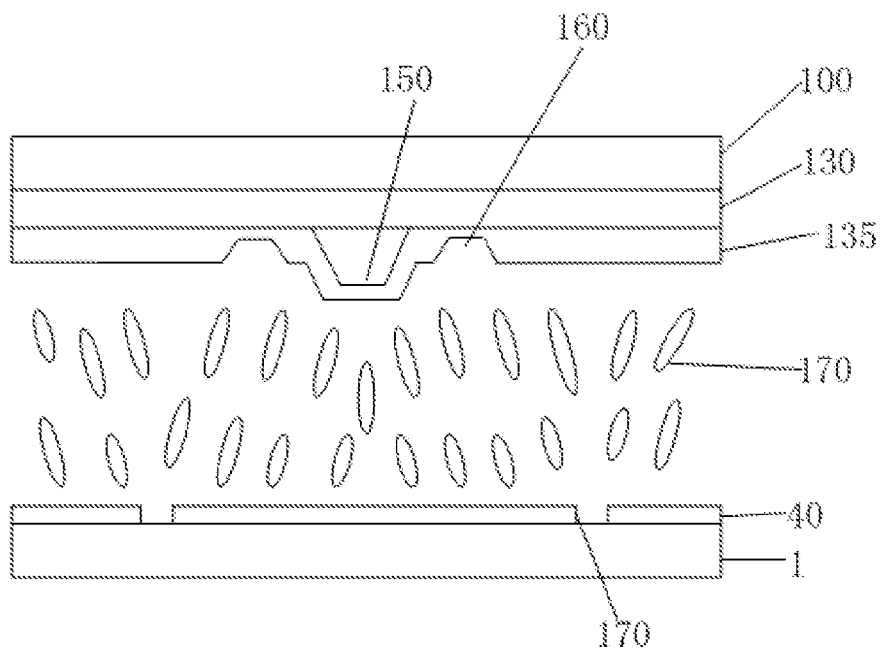
FIG. 4 is a sectional view illustrating another liquid crystal panel provided by an embodiment of the invention.

As an embodiment of the invention, the layer in which a protrusive structure 150 illustrated in FIG. 4 is located is a protrusive structural layer, and lies on a color filter layer 130, the layer in which a recess 160 is located is a passivation layer 135, and the layer where the protrusive structure 150 is located lies below the layer where the recess 160 is located. A common electrode on a color filter substrate in FIG. 4 is not illustrated.

In embodiments of the invention, a color filter substrate includes a color filter layer 130, a planarizing layer 135 located on the color filter layer 130 and a common electrode layer 140 located on the planarizing layer.

Figure 5:
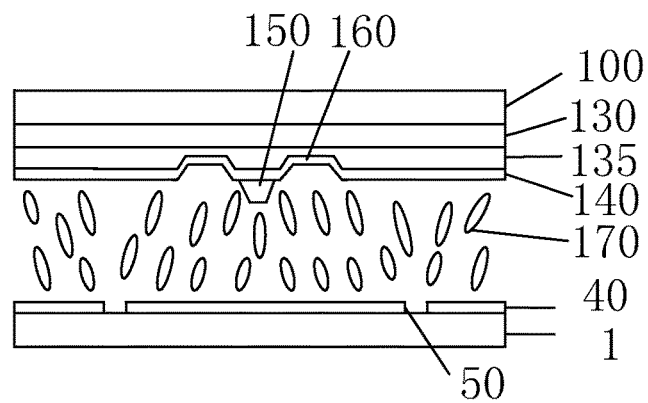
FIG. 5 is a sectional view illustrating still another liquid crystal panel provided by an embodiment of the invention.

Referring to FIG. 5, a protrusive structure 150 is situated on the common electrode layer 140, and a recess 160 is situated in the planarizing layer 135; the color filter substrate illustrated in FIG. 5 may further include a black matrix layer (not illustrated in the figure).

Or, referring to FIG. 2, a protrusive structure 150 is situated on the common electrode layer 140, and a recess 160 is situated in the color filter layer 130.

Or, referring to FIG. 3, a protrusive structure 150 is situated on the planarizing layer 135, a recess 160 is situated in the planarizing layer 135; the color filter substrate illustrated in FIG. 3 may further includes a black matrix layer (not illustrated in the figure).

Figure 6:
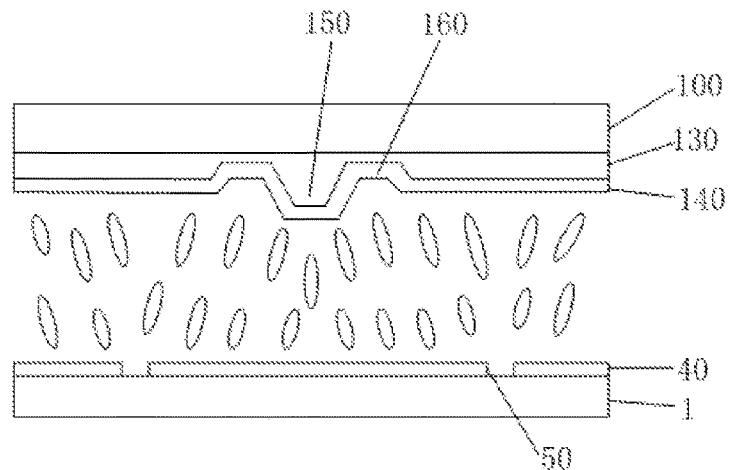
FIG. 6 is a sectional view illustrating yet still another liquid crystal panel provided by an embodiment of the invention.

Or, referring to FIG. 6, a protrusive structure 150 is situated on the color filter layer 130, and a recess 160 is situated in the color filter layer 130. The color filter substrate illustrated in FIG. 6 may further include a black matrix layer and a planarizing layer (not illustrated in the figure).

Further, embodiments in accordance with the invention are not limited to the above cases, and for example, the protrusive structure may be situated on the planarizing layer, and the recess is situated in a color filter layer. Alternatively, the protrusive structure is situated on the color filter layer, and the recess is situated in the planarizing layer.

Figure 7:
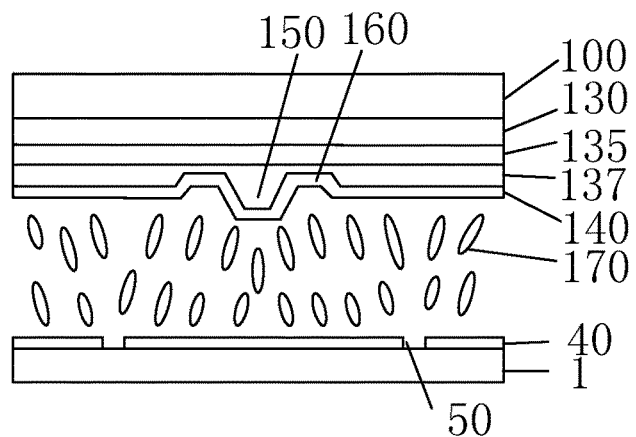
FIG. 7 is a sectional view illustrating another liquid crystal panel provided by an embodiment of the invention.

In an embodiment of the invention, referring to FIG. 7, the color filter substrate includes a color filter layer 130, an alignment structural layer 137 located on the color filter layer 130 and a common electrode layer 140 located on the alignment structural layer 137; a protrusive structure 150 is situated on the alignment structural layer 137, and a recess 160 is situated in the alignment structural layer 137. In an embodiment of the invention, a planarizing layer 135 may be further included between the color filter layer 130 and the alignment structural layer 137, and a black matrix layer may be further included between a glass substrate 100 and the color filter layer 130.

Figure 8:
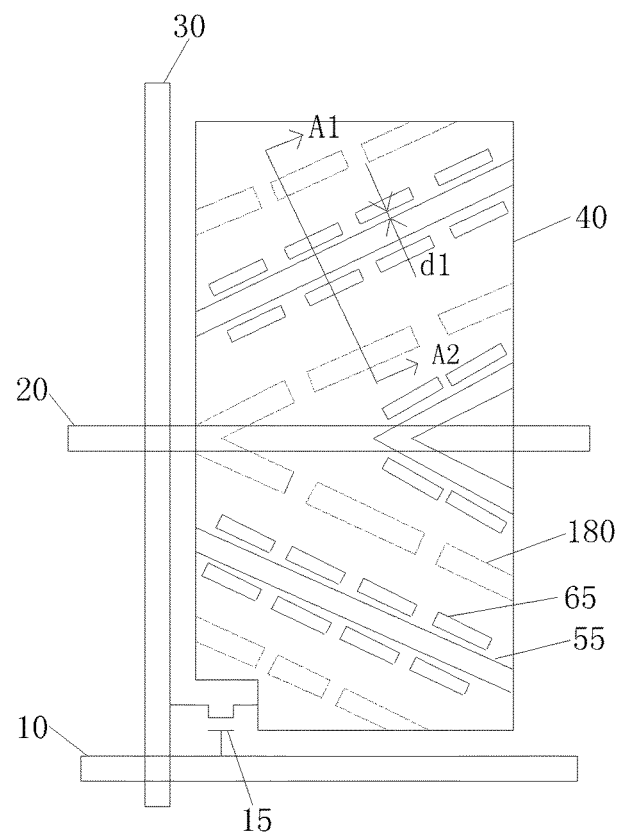
FIG. 8 is a sectional view illustrating still another liquid crystal panel provided by an embodiment of the invention.
Figure 9:
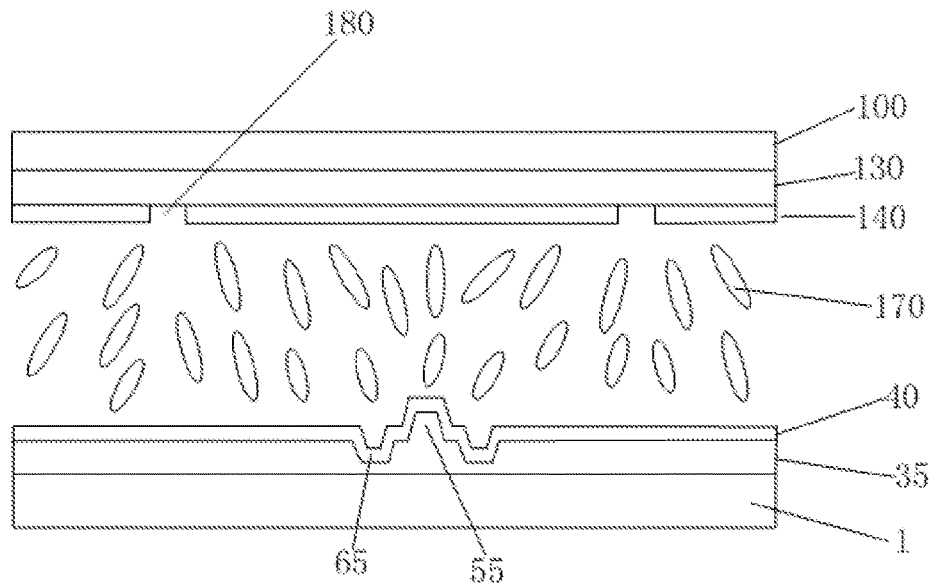
FIG. 9 is a sectional view taken along line A1-A2 of the liquid crystal panel illustrated in FIG. 8.

Referring to FIG. 8 and FIG. 9, according to an embodiment of the invention, there is provided a liquid crystal panel, which may include an array substrate and a color filter substrate. The array substrate includes a glass substrate 1, a gate line 10, a data line 30, a thin film transistor 15 and a pixel electrode 40; the color filter substrate includes a glass substrate 100, a color filter layer 130 and a common electrode layer 140; and a liquid crystal layer is provided between the array substrate and the color filter substrate. A protrusive structure 55 and a recess 65 are provided on the array substrate; and slits 180 are provided in the common electrode layer 140. The thin film transistor 15 of the array substrate includes a gate electrode, a gate insulating layer, an active layer, a source electrode and a drain electrode, and a passivation layer 35 is located above thin film transistor.

The protrusive structure 55 and/or the recess 65 may also be situated at preset layer(s) on the array substrate. The layer where the protrusive structure 55 is located lies above the layer where the recess 65 is located; or, the layer where the protrusive structure 55 is located is the same as the one where the recess 65 is located; or the layer where the protrusive structure 55 is located lies below the layer where the recess 65 is located. With each of the above settings, the alignment effect of the protrusive structure 150 on liquid crystal molecules can be strengthened.

As an embodiment of the invention, referring to FIG. 9, the array substrate includes a passivation layer 35, and a pixel electrode 40 located on the passivation layer 35. The array substrate further includes a thin film transistor 15 (not illustrated in the figure), and the passivation layer 35 lies above the thin film transistor 15.

The protrusive structure 55 is situated on the passivation layer 35, the recess 65 is situated in the passivation layer 35, and the layer where the protrusive structure 55 is located and the layer where the recess 65 is located are the same layer.

Or, the protrusive structure 55 may also be situated on the pixel electrode, and the recess 65 is situated in the passivation layer 35.

Figure 10:
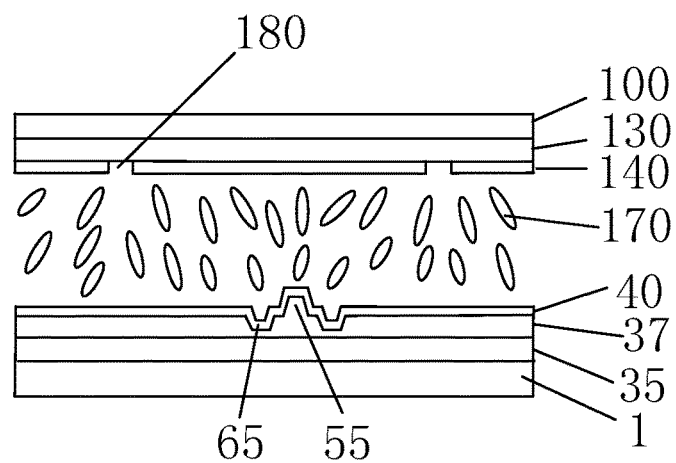
FIG. 10 is a sectional view illustrating another liquid crystal panel provided by an embodiment of the invention.

As an embodiment of the invention, referring to FIG. 10, the array substrate includes an alignment structural layer 37, and a pixel electrode 40 located on the alignment structural layer 37.

A protrusive structure 55 is situated on the alignment structural layer, and a recess 66 is situated in the alignment structural layer.

The array substrate may further include a passivation layer 35, the alignment structural layer 37 is located above the passivation layer 35, and the passivation layer 35 is located above a thin film transistor (not illustrated in the figure).

In the above embodiments, the shape of a cross section of the protrusive structure (150, 55) and/or the recess (160, 65) includes a rectangle, a square, a trapezoid, a polygon, a semicircle, or other irregular shape. For example, the cross section is taken along a direction perpendicular to the plane where the glass substrate of the array substrate or the color filter substrate is located. For example, the cross section of the recess (160, 65) may be a trapezoid, and a longer base of the trapezoid may face the liquid crystal layer. The cross section of the protrusive structure (150, 55) may be a trapezoid, and a shorter base of the trapezoid may face the liquid crystal layer.

There is no limitation on the stereo shape of the protrusive structure (150, 55) and/or the recess (160, 65), wherein, stereo shapes of the protrusive structure (150, 55) and the recess (160, 65) include a cuboid, a cube, a polyhedron, a hemisphere or other irregular stereoshape.

In embodiments of the invention, the recess (160, 65) may be disposed on the left side, the right side, the top side or the bottom side of the protrusive structure (150, 55), and may also be disposed to encircle the protrusive structure (150, 55). Embodiments of the invention do not set a limit to position of the recess (160, 65) relative to the protrusive structure (150, 55).

Figure 11:
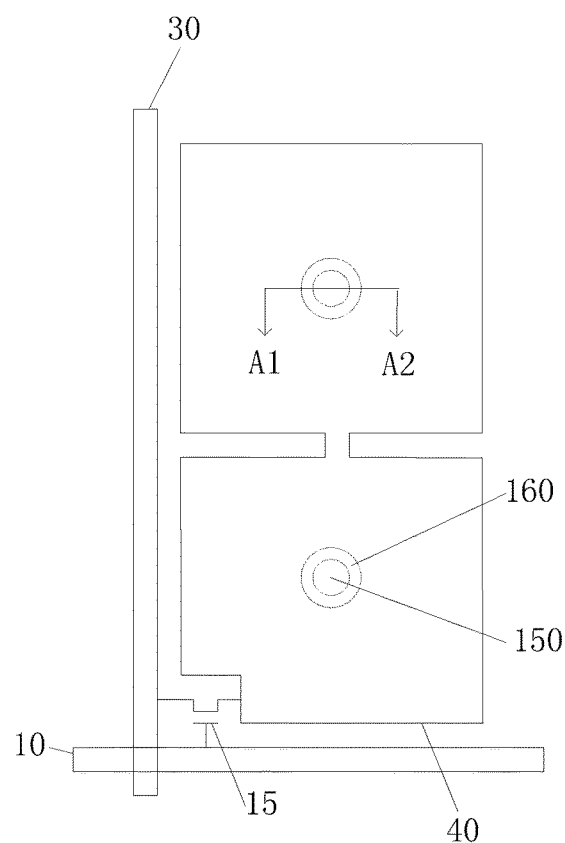
FIG. 11 is a top view illustrating another liquid crystal panel provided by an embodiment of the invention.
Figure 12:
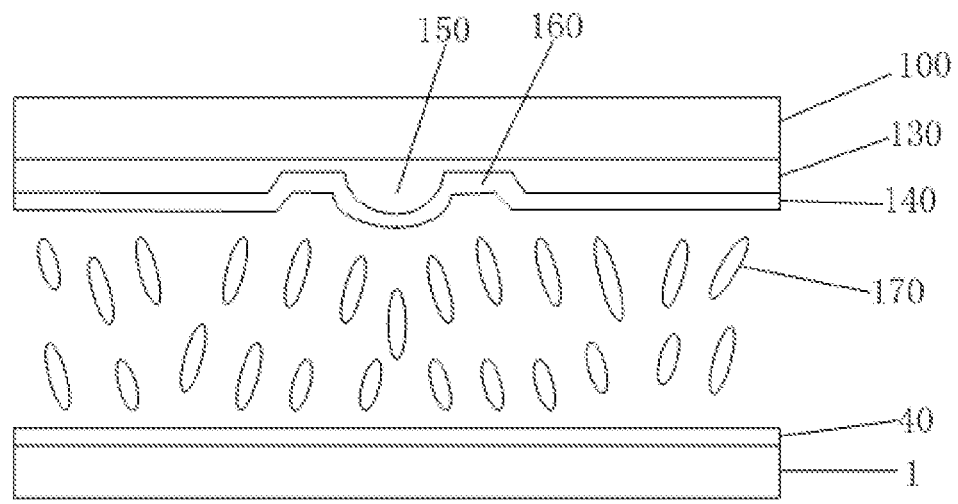
FIG. 12 is a sectional view taken along line A1-A2 of the liquid crystal panel illustrated in FIG. 11.

Referring to a liquid crystal panel illustrated in FIG. 11 and FIG. 12, an array substrate includes a glass substrate 1, a gate line 10, a data line 30 and a pixel electrode 40; a color filter substrate includes a glass substrate 100, a color filter layer 130 and a common electrode layer 140; and a liquid crystal layer 170 is provided between the array substrate and the color filter substrate. A protrusive structure 150 is provided on the color filter substrate, and a recess 160 is arranged nearby the protrusive structure 150. Specifically, the protrusive structure 150 and the recess 160 are arranged in the color filter layer 130. The protrusive structure 150 has the shape of a hemisphere, and the recess 160 has an annular shape, and is arranged around the protrusive structure 150 in a circle. The color filter substrate may further include a black matrix layer and a planarizing layer (not illustrated in the figure). That is, as seen from a plane graph, the protrusive structure 150 is surrounded by the recess 160.

Figure 13:
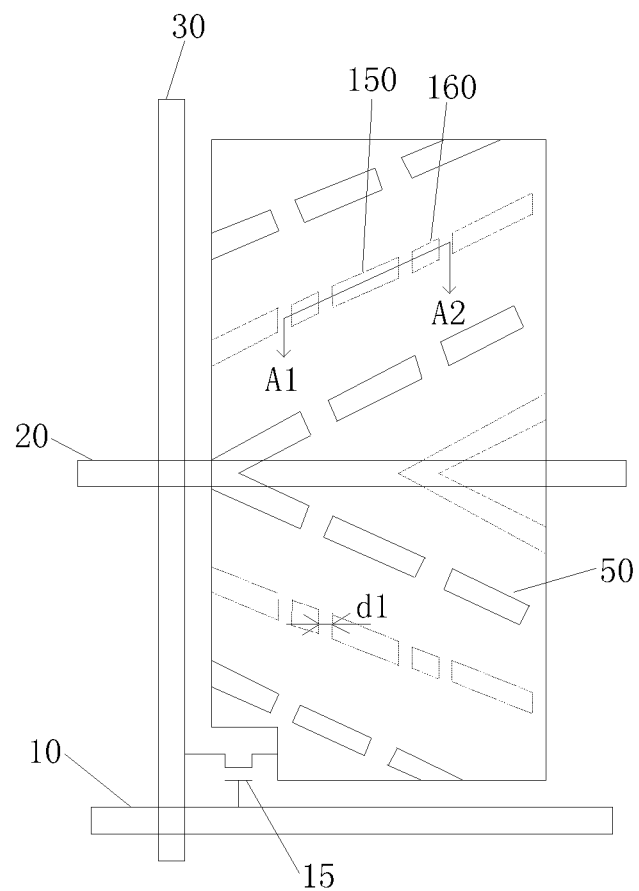
FIG. 13 is a top view illustrating another liquid crystal panel provided by an embodiment of the invention.
Figure 14:
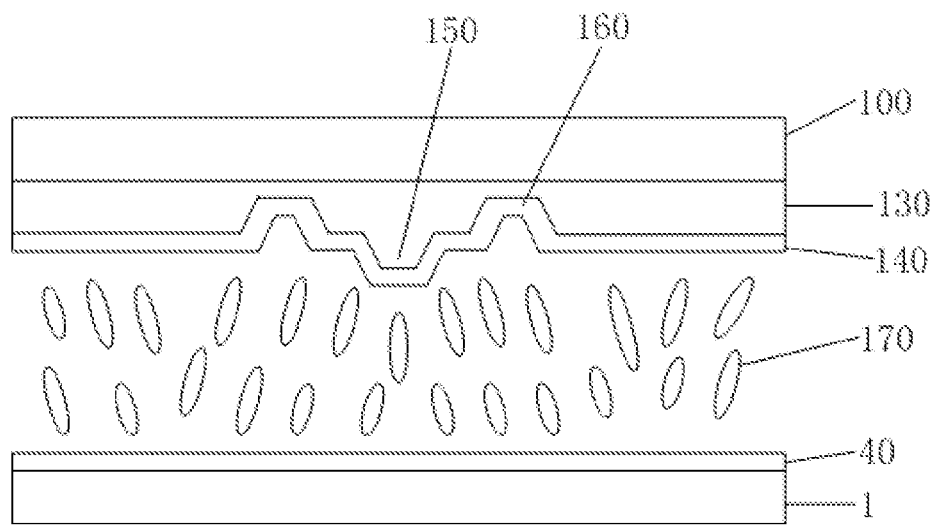
FIG. 14 is a sectional view taken along line A1-A2 of the liquid crystal panel illustrated in FIG. 13.

Referring to a liquid crystal panel illustrated in FIG. 13 and FIG. 14, the liquid crystal panel includes an array substrate and a color filter substrate. The array substrate includes a glass substrate 1, a gate line 10, a data line 30 and a pixel electrode 40; the color filter substrate includes a glass substrate 100, a color filter layer 130 and a common electrode layer 140; and a liquid crystal layer 170 is provided between the array substrate and the color filter substrate. Slits 50 are provided in the pixel electrode 40, protrusive structures 150 are provided on the color filter substrate, and the slits 50 and the protrusive structures 150 are arranged alternatively. A recess 160 is arranged around a protrusive structure 150. Specifically, the recess 160 may be disposed nearby the top of a protrusive structure 150, and the recess 160 may be in the shape of a cuboid. Specifically, the protrusive structure 150 and the recess 160 are disposed in the color filter layer 130. The color filter substrate may further include a black matrix layer and a planarizing layer.

In some embodiments, height of a protrusive structure (150, 55) may be greater than or equal to 0.5 microns, and smaller than or equal to 3.0 microns. In some embodiments, depth of the recess (160, 65) is greater than or equal to 0.5 microns, and smaller than or equal to 3.0 microns. For example, height of the protrusive structure and depth of the recess refer to size of the protrusive structure or the recess in a direction perpendicular to a surface of a base substrate.

Because cell thickness of the liquid crystal panel is generally in the range of 3.0 microns to 7.0 microns, when height of the protrusive structure (150, 55) and depth of the recess (160, 65) are in the above range, a better controlling function on alignment of liquid crystals can be served.

For example, the distance between the recess (160, 65) and the protrusive structure (150, 55) is greater than or equal to 0 micron and smaller than or equal to 30.0 microns. The smaller the distance between the recess (160, 65) and the protrusive structure (150, 55) is, the stronger the controlling function of the protrusive structure (150, 55) on alignment of liquid crystals is. When the distance between the recess (160, 65) and the protrusive structure (150, 55) falls within the above range, a better controlling function on alignment of liquid crystal molecules can be achieved. When the distance between the recess (160, 65) and the protrusive structure (150, 55) is greater than 30.0 microns, controlling function of the protrusive structure (150, 55) on alignment of liquid crystal molecules becomes worse. The distance between the protrusive structure (150, 55) and the recess (160, 65) refers to the closest distance between the two in a direction parallel to a surface of a base substrate.

Referring to FIG. 1, FIG. 2, FIG. 8 and FIG. 13, in the above embodiments, depth of the recess (160, 65) is d2 (0.5 microns ≤d2≤3.0 microns, and in some examples, 1.0 microns ≤d2≤2.0 microns); height of the protrusive structure (150, 55) is d3 (0.5 microns ≤d3≤3.0 microns, and in some examples, 1.0 microns ≤d3≤2.0 microns); and the closest distance between the recess (160, 65) and the protrusive structure (150, 55) is d1 (in some examples, 0≤d1≤30.0 microns, and in some other examples, 0≤d1≤10.0 microns).

Figure 15:
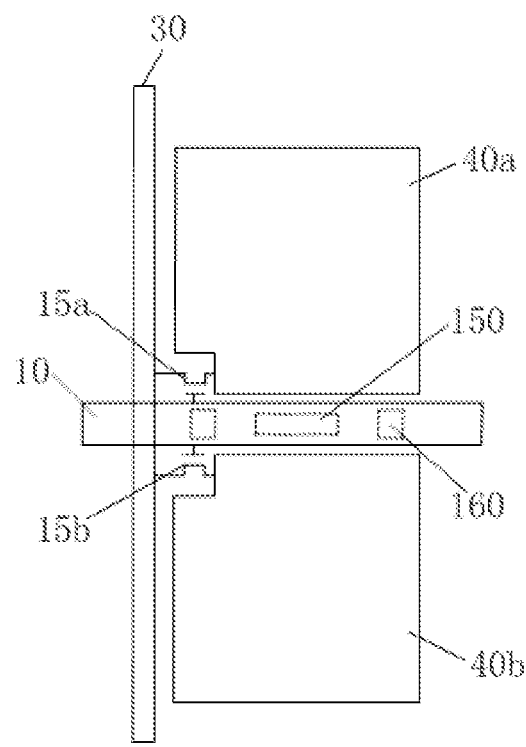
FIG. 15 is a top view illustrating a liquid crystal panel provided by an embodiment of the invention.

According to an embodiment of the invention, there is provided a liquid crystal panel. As illustrated in FIG. 15, the array substrate includes an array substrate and a color filter substrate. The array substrate includes gate lines 10, data lines 30 and a plurality of pixel units. Each of the pixel units includes a first sub-pixel electrode 40a and a second sub-pixel electrode 40b, and the first sub-pixel electrode 40a and the second sub-pixel electrode 40b are arranged on two sides of a gate line 10 in correspondence with the pixel unit, respectively.

A protrusive structure 150 and a recess 160 are located on the color filter substrate; and locations of the protrusive structure 150 and the recess 160 overlap with location of the gate line 10 at least in part.

In the liquid crystal panel illustrated in FIG. 15, the first sub-pixel electrode 40a is connected to a data line 30 through a first thin film transistor 15a, the second sub-pixel electrode 40b is connected to the data line 30 through a second thin film transistor 15b, and alignment of liquid crystal molecules located between the first sub-pixel electrode 40a and 40b will be interfered by an electric field generated by the first sub-pixel electrode 40a, the second sub-pixel electrode 40b, the data line 30 and the gate line 10.

In the liquid crystal panel illustrated in FIG. 15, the protrusive structure 150 and the recess 160 are disposed on the color filter substrate; and locations of the protrusive structure 150 and the recess 160 overlap with location of the gate line 10 at least in part. The protrusive structure 150 and the recess 160 can act to adjust the alignment of liquid crystal molecules located between the first sub-pixel electrode 40a and 40b, and in the event that locations of the protrusive structure 150 and the recess 160 overlap with location of the gate line 10 at least in part, local light leakage caused by the protrusive structure 150 and the recess 160 can be reduced.

Or, the protrusive structure 150 and the recess 160 are located on the array substrate; and locations of the protrusive structure 150 and the recess 160 overlap with location of the gate line 10 at least in part.

In descriptions of the present specification, specific characteristics, structures, materials or features may be combined in a suitable manner in any one or more embodiments or examples.

Descriptions made above are merely exemplary embodiments of the invention, but are not used to limit the protection scope of the invention. The protection scope of the invention is determined by attached claims.

This application claims the benefit of priority from Chinese patent application No. 201420750527.1, filed on Dec. 3, 2014, the disclosure of which is incorporated herein in its entirety by reference as a part of the present application.

The invention claimed is:

1. A liquid crystal panel, comprising a color filter substrate and an array substrate disposed opposite to each other, and a liquid crystal layer located between the color filter substrate and the array substrate, an initial state of liquid crystal molecules in the liquid crystal layer being vertical alignment, wherein, a protrusive structure is provided on the color filter substrate, a recess is provided around the protrusive structure, the layer where the protrusive structure is located is located below the layer where the recess is located, the array substrate includes gate lines and locations of the recess overlap with locations of the gate lines at least in part;

wherein, the color filter substrate includes a color filter layer, a planarizing layer located on the color filter layer and a common electrode layer located on the planarizing layer;

the protrusive structure is situated on the color filter layer, and the recess is situated in the planarizing layer; and wherein, as seen from a plane graph, the protrusive structure is surrounded by the recess.

2. The liquid crystal panel according to claim 1, wherein, a stereo shape of the protrusive structure and/or the recess includes a cuboid, a cube, a polyhedron, and a hemisphere.

3. The liquid crystal panel according to claim 1, wherein, height of the protrusive structure is greater than or equal to 0.5 microns, and smaller than or equal to 3.0 microns.

4. The liquid crystal panel according to claim 1, wherein, depth of the recess is greater than or equal to 0.5 microns, and smaller than or equal to 3.0 microns.

5. The liquid crystal panel according to claim 1, wherein, a distance between the recess and the protrusive structure is greater than or equal to 0 micron and smaller than or equal to 30.0 microns.

6. The liquid crystal panel according to claim 1, wherein, the array substrate includes data lines and a plurality of pixel units, each of the pixel units includes a first sub-pixel electrode and a second sub-pixel electrode, and the first sub-pixel electrode and the second sub-pixel electrode are arranged on both sides of a gate line in correspondence with the pixel unit.

7. The liquid crystal panel according to claim 1, wherein, the array substrate includes data lines and a plurality of pixel units, each of the pixel units includes a first sub-pixel electrode and a second sub-pixel electrode, and the first sub-pixel electrode and the second sub-pixel electrode are arranged on both sides of a gate line in correspondence with the pixel unit.

8. A liquid crystal display device, comprising the liquid crystal panel according to claim 1.

9. The liquid crystal display device according to claim 8, wherein, a stereo shape of the protrusive structure and/or the recess includes a cuboid, a cube, a polyhedron, and a hemisphere.

* * * * *